United States Patent

Bristol

[11] Patent Number: 5,147,437
[45] Date of Patent: Sep. 15, 1992

[54] INVISIBLE FLAT-TOP MOLD BLANK AND METHOD FOR MANUFACTURING SAME

[76] Inventor: Alexander C. Bristol, 14317 SW. 142 Ave., Miami, Fla. 33186

[21] Appl. No.: 399,251

[22] Filed: Aug. 28, 1989

Related U.S. Application Data

[62] Division of Ser. No. 223,645, Jul. 25, 1988, Pat. No. 4,883,524.

[51] Int. Cl.⁵ .............................................. C03B 23/00
[52] U.S. Cl. ....................................... 65/102; 65/107; 65/110; 264/2.5; 264/1.8; 425/808
[58] Field of Search ................ 65/102, 107, 110, 286, 65/287; 264/1.8, 2.5; 425/808; 249/134; 351/170

[56] References Cited

U.S. PATENT DOCUMENTS

| | | | |
|---|---|---|---|
| 901,659 | 10/1908 | Stevens | 65/37 |
| 2,006,638 | 7/1935 | Hammon | 351/170 |
| 2,216,182 | 10/1940 | Boeder et al. | 351/170 |
| 2,388,687 | 11/1945 | Hammon | 65/38 |
| 2,685,821 | 8/1954 | Tillyer et al. | 65/39 |
| 3,681,043 | 8/1972 | Bognar | 65/107 |
| 4,062,629 | 12/1977 | Winthrop | 351/169 |
| 4,139,677 | 2/1979 | Blair et al. | 65/66 |
| 4,163,655 | 8/1979 | Campbell | 351/170 |
| 4,349,374 | 9/1982 | Rupp | 65/107 |
| 4,676,610 | 6/1987 | Barkan et al. | 351/169 |
| 4,883,524 | 11/1989 | Bristol | 65/37 |

*Primary Examiner*—W. Gary Jones
*Assistant Examiner*—John J. Bruckner
*Attorney, Agent, or Firm*—Gifford, Groh, Sprinkle, Patmore & Anderson

[57] ABSTRACT

A mold blank for manufacturing eyeglass lenses containing a flat top bifocal segment. A ceramic platform is first constructed containing an optical surface having a recess corresponding to the flat top bifocal segment. A concave-convex glass mold blank polished on both sides is placed on the optical surface and across the recess of the platform and the mold blank together with the platform is placed in a furnace. The furnace is then heated to a preselected temperature at which the mold blank thermally deforms and sags against the optical surface and into the recess. Upon cooling the mold blank can be used to mold plastic eyeglass lenses. A method for making the mold blank is also disclosed.

8 Claims, 2 Drawing Sheets

INVISIBLE FLAT-TOP MOLD BLANK AND METHOD FOR MANUFACTURING SAME

This is a divisional of copending application Ser. No. 223,645 filed on Jul. 25, 1988, now U.S. Pat. No. 4,883,524.

BACKGROUND OF THE INVENTION

I. Field of the Invention

The present invention relates generally to mold blanks for manufacturing plastic eyeglass lenses and, more particularly, to such a mold blank having a flat top bifocal segment.

II. Description of the Prior Art

In the manufacture of plastic eyeglass lenses, an optical surface is first machined onto one side of a platform. Such platforms are typically constructed of ceramic.

A glass mold blank is placed onto the platform optical surface and the assembly is then placed into a furnace. The furnace is heated to a preselected temperature at which the mold blank thermally deforms and is sagged against the optical surface of the platform so that the mold blank conforms to the optical surface. Upon cooling, the mold blank is used to manufacture plastic eyeglass lenses.

Thermal sagging has not been previously used to construct a mold blank having a flat top bifocal segment.

SUMMARY OF THE PRESENT INVENTION

The present invention provides both a mold blank and a method for constructing a mold blank having a flat top bifocal segment which cannot be seen.

In brief, the mold blank of the present invention is constructed by first machining an optical surface onto one side of a ceramic platform. The optical surface generally comprises a concave surface having a recess corresponding to the flat top bifocal segment. Such ceramic platforms are typically constructed by grinding.

A glass mold blank having a convex-concave shape is then positioned onto the optical surface on the ceramic platform so that the convex surface of the mold blank abuts against the concave surface on the platform and overlies the recess. This assembly is then placed within an oven and heated to a temperature such that the mold blank thermally deforms. When the mold blank thermally deforms, a portion of the mold blank is sagged into the recess formed on the platform corresponding to the flat top bifocal segment, either by use of vacuum or pressure. Contrary to the mold blank, the ceramic platform does not thermally deform but, instead, remains substantially rigid at the preselected temperature.

The mold blank and platform are then removed from the oven and the mold blank is then used to mold plastic eyeglass lenses in the conventional fashion. Such plastic eyeglass lenses will include the flat top bifocal segment but, unlike the previously known flat top bifocal segments, the lines of demarcation surrounding the bifocal segments are virtually invisible.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENTS OF THE PRESENT INVENTION

Figure 1:
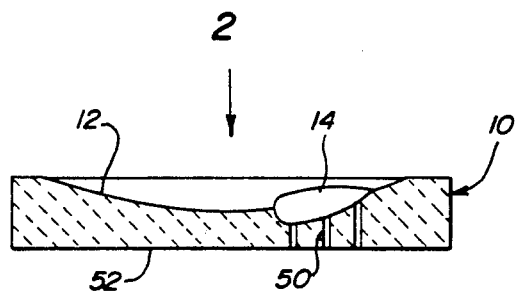
FIG. 1 is a side view illustrating a platform used in conjunction with the present invention.
Figure 2:
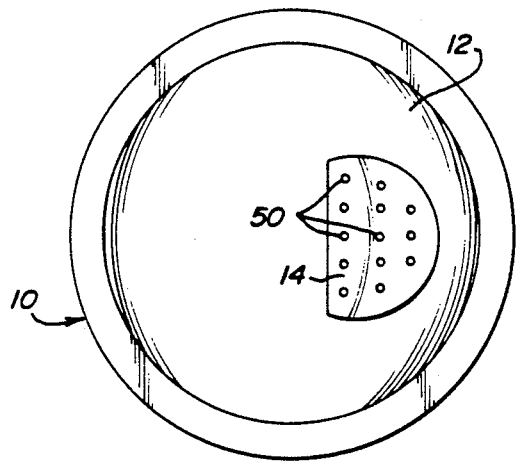
FIG. 2 is a view taken along arrow 2 in FIG. 1.

With reference first to FIGS. 1 and 2, in constructing the mold blank according to the present invention, a platform 10 is first constructed. The platform 10 is generally circular in shape (see FIG. 2) and is constructed of a material, such as ceramic, which remains substantially rigid at high temperature. Other materials may, however, alternatively be used.

Still referring to FIGS. 1 and 2, a concave optical surface 12 is machined onto one side of the platform 10. Additionally, a recess 14 is also machined into the optical surface 12. This recess 14 corresponds in shape to the desired flat top bifocal segment for the desired eyeglass lens. Furthermore, the recess 14 is machined onto the optical surface 12 in any conventional fashion, such as by grinding.

A plurality of holes 50 ere drilled or otherwise formed through the platform 10. These holes 50 are open at one end to the recess 14 and, at their other end, to a bottom 52 of the platform 10. The purpose for the holes will be subsequently described.

Figure 3:
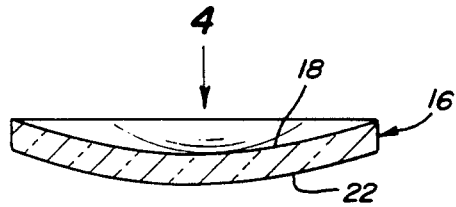
FIG. 3 is a side view illustrating a mold blank according to the present invention.
Figure 4:
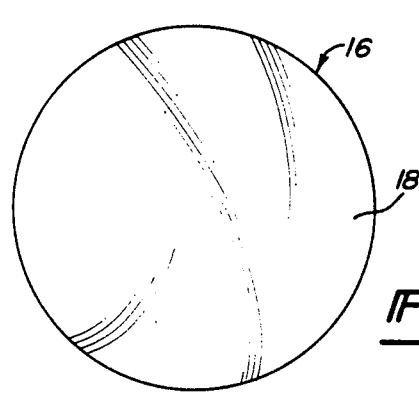
FIG. 4 is a view taken substantially along arrow 4 in FIG. 3.

With reference now to FIGS. 3 and 4, a generally circular mold blank 16 is constructed from glass. The mold blank 16 includes both a concave polished surface 18 and a convex polished surface 22 which is spaced apart and generally parallel to the concave surface 18. The surfaces 18 and 22 on the mold blank 16 are machined in any conventional fashion, such as by grinding and polishing.

Figure 5:
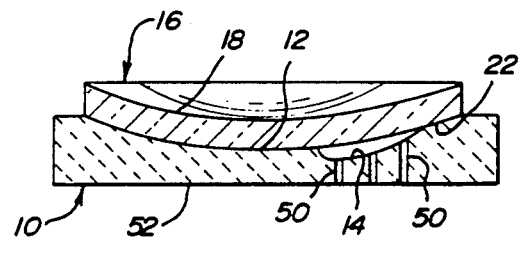
FIG. 5 is a side view of the mold blank positioned on top of the platform.

With reference now to FIG. 5, the convex surface 22 of the mold blank 16 is positioned on the concave surface 12 of the platform 10 so that the mold blank 16 overlies the recess 14.

Figure 9:
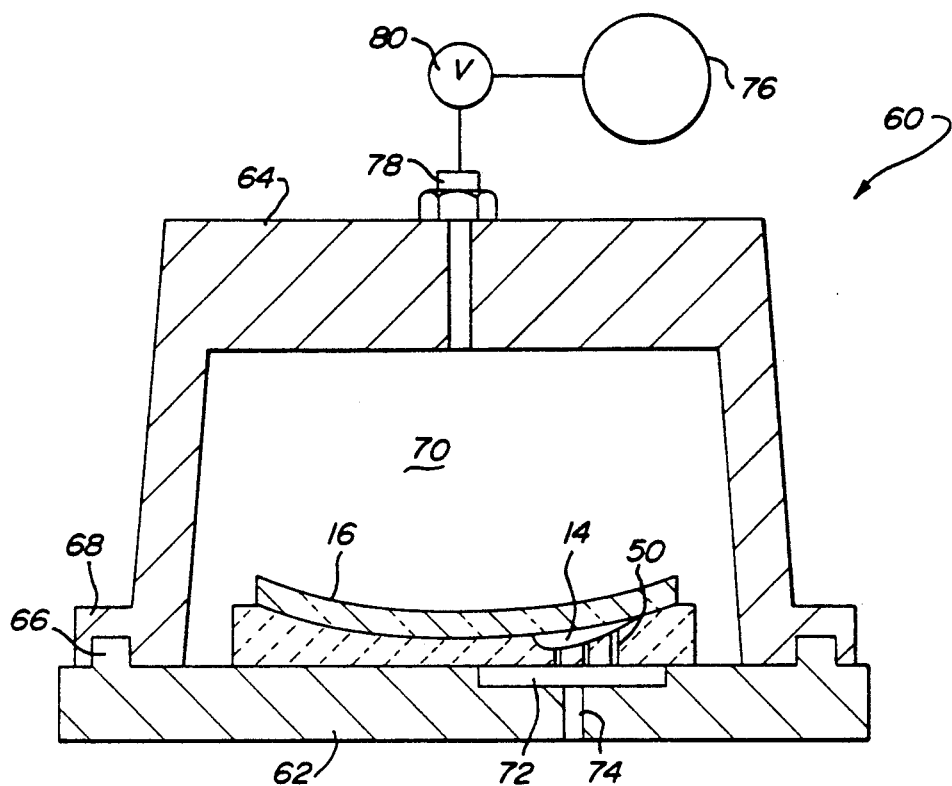
FIG. 9 is a side view illustrating a preferred embodiment of the present invention.

With reference now to FIG. 9, the preferred embodiment of the present invention further comprises a housing 60 having a lower housing part 62 and an upper housing part 64. The upper housing part 64 is detachably secured to the lower housing part 62 in any conventional fashion. Although any conventional fashion can be used to detachably secure the housing parts 62 and 64 together, preferably female locking tabs 68 on the upper housing part 64 lockingly engage female locking tabs 66 formed on the lower housing part 62. Consequently, a slight twist between the housing parts 62 and 64 locks the housing parts together while a slight twist in the opposite direction allows the housing parts 62 and 64 to be separated from each other.

With the housing parts 62 and 64 secured together as shown in FIG. 9, the housing 60 forms a housing chamber 70. Furthermore, the seal between the housing parts 62 and 64 is airtight, or nearly airtight since small leaks do not adversely affect the present invention.

The platform 10 with the mold blank 16 positioned on top of it as shown in FIG. 5 is then positioned within the housing chamber 70 so that the holes 50 register with a plenum 72 formed in the lower housing part 62. An exhaust port 74 also fluidly connects the plenum 72 to atmospheric pressure.

Still referring to FIG. 9, a source of air pressure 76 is fluidly connected by a connector 78 to the housing chamber 70. Additionally, a valve 80 is connected in series between the air pressure source 76 and the chamber 70 to enable the chamber 70 to be selectively pressurized between a pressure of between 1 and 100 psi over atmospheric pressure.

Figure 6:
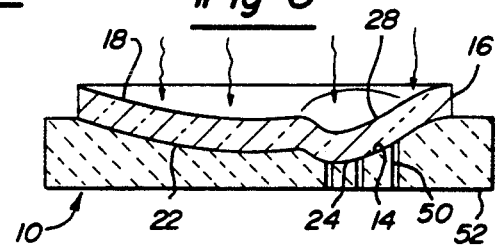
FIG. 6 is a view similar to FIG. 5 but illustrating the mold blank after it has thermally deformed.

The housing 60 with the platform 10 and mold blank 16 is then positioned within an oven and heated to a preselected temperature. At the preselected temperature, the mold blank 16 thermally deforms or softens and, simultaneously, the air valve 80 is opened to pressurize the chamber 70. In doing so, a portion 24 of the mold blank 16 is sagged into the recess 14 on the platform 10 as shown in FIG. 6. As the mold blank 16 is sagged into the recess 14, the air in the recess 14 is exhausted through the holes 50 and exhaust port 74 to the atmosphere.

Figure 10:
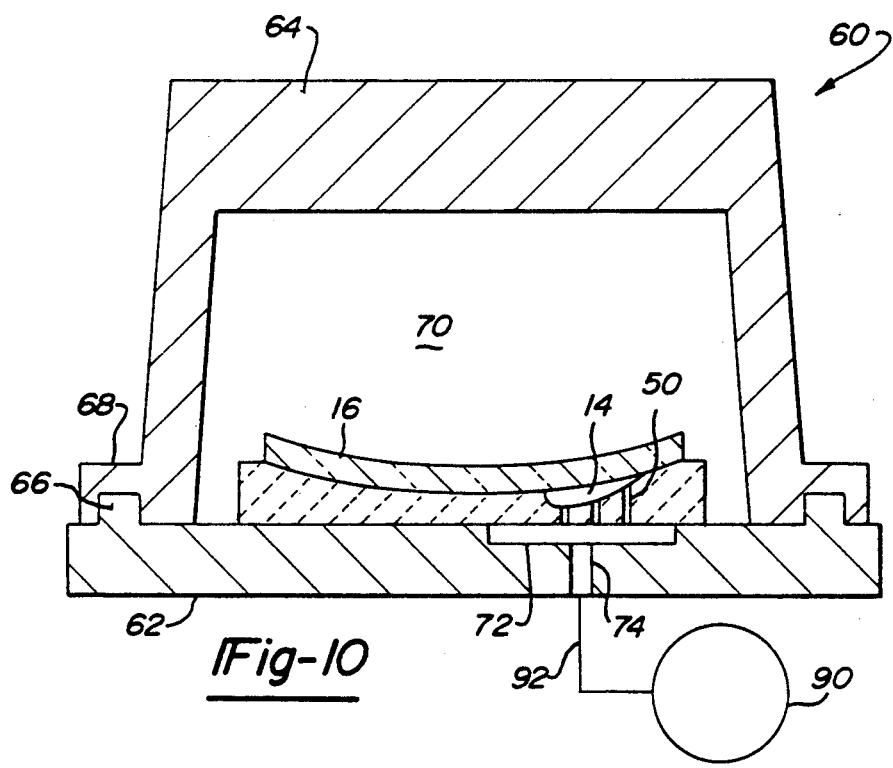
FIG. 10 is a view similar to FIG. 9 but illustrating a modification thereof.

With reference now to FIG. 10, in lieu of the air pressure source 76, a vacuum source 90 is fluidly connected to the exhaust port 74 by conventional fluid connectors 92.

Since the platform 10 is constructed of a ceramic material, the platform 10 has a very low thermal expansion. Consequently, the ceramic platform 10 remains substantially rigid at the preselected temperature.

Figure 7:
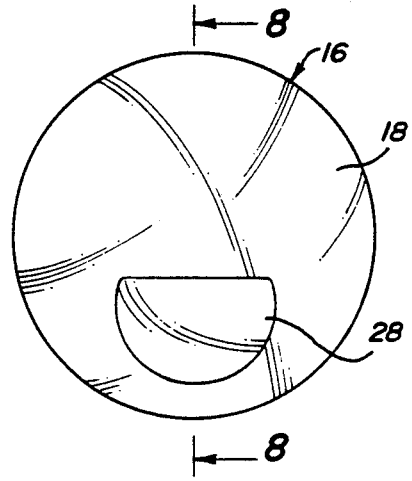
FIG. 7 is a front view illustrating the mold blank of the present invention.
Figure 8:
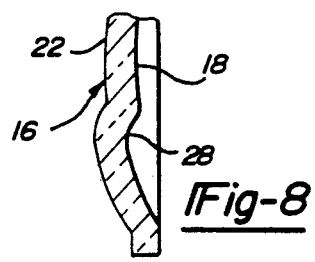
FIG. 8 is a view taken substantially along line 8—8 in FIG. 7.

With reference now to FIGS. 7 and 8 the mold blank 16 is thereshown after it has been removed from the oven and cooled. The mold blank 16 includes a recessed portion 28 on its concave surface 18 which conforms in shape to the flat top bifocal segment desired in the end eyeglass lens. However, since the mold blank 16 was formed by thermal sagging the mold blank 16 into the recess 14 on the platform 10, there are no sharp lines surrounding the flat top bifocal segment. Consequently, when the mold blank 16 is used to mold plastic eyeglass lenses in the conventional fashion, the flat top bifocal segment is substantially invisible.

From the foregoing, it can be seen that the present invention provides a simple and yet totally effective way for constructing a mold blank having a flat top bifocal segment for use with plastic lenses.

Having described my invention, however, many modifications thereto will become apparent to those skilled in the art to which it pertains without deviation from the spirit of the invention as defined by the scope of the appended claims.

I claim:

1. A mold blank for manufacturing optical lenses containing a flat top bifocal segment, comprising:
    a mold blank having a concave surface and a convex surface, said mold blank being constructed of a thermally deformable material, said mold blank having a single layer, said mold blank further having an optical surface from which a flat top bifocal segment is formed;
    a platform;
    wherein said mold blank is formed by placing said convex surface of said mold blank on said platform, said platform having an optical surface with a recess;
    means for applying a pressure to said concave surface of said mold blank comprising an air pressure source, said source causing said mold blank to deform against said recess so as to form said flat top bifocal segment;
    means for heating said platform and said mold blank to a preselected temperature at which said mold blank thermally deforms and is sagged against said optical surface and into said recess to form said flat top bifocal segment; and
    wherein said platform is constructed of a material which does remain substantially rigid at said preselected temperature.

2. The invention as defined in claim 1 wherein said mold blank is constructed of glass.

3. The invention as defined in claim 1 wherein said platform comprises a concave surface spaced apart and generally parallel to said convex surface of said mold blank.

4. The invention as defined in claim 1 wherein said platform is constructed of ceramic.

5. The invention as described in claim 1, wherein said means for applying a pressure comprises an air pressure source connected to a housing chamber, said air pressure causing said mold blank portion to deform against said platform recess.

6. The invention as described in claim 1, further comprising a vacuum source connected to an exhaust port of said platform recess, said mold blank portion being withdrawn into said platform recess by said vacuum source.

7. An invisible flat top mold blank, comprising:
    a mold blank having a concave surface and a convex surface;
    a platform having a concave surface, said concave surface receiving said convex surface of said mold blank, said concave platform surface further having a recess defined therein;
    a housing having a lower housing part and an upper housing part, said housing encapsulating said mold blank and said platform to form a housing chamber;
    means for heating said mold blank to a preselected temperature; and
    means for deforming a portion of said mold blank against said platform recess so as to form a flat top bifocal segment, said deforming means comprising an air pressure source connected to said housing chamber, said air pressure source causing said mold blank to deform against said platform recess so as to form a flat top bifocal segment.

8. The invention as described in claim 7, wherein said deforming means further comprises a vacuum source connected to an exhaust port of said platform recess, said mold blank portion being withdrawn into said platform recess by said vacuum source.

* * * * *